United States Patent
Nainar et al.

(10) Patent No.: US 10,313,153 B2
(45) Date of Patent: Jun. 4, 2019

(54) ADAPTIVE MAC GROUPING AND TIMEOUT IN EVPN ENVIRONMENTS USING MACHINE LEARNING

(71) Applicant: Cisco Technology, Inc., San Jose, CA (US)

(72) Inventors: Nagendra Kumar Nainar, Morrisville, NC (US); Carlos M. Pignataro, Raleigh, NC (US); Alejandro A. Eguiarte Salazar, Cary, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 15/443,593

(22) Filed: Feb. 27, 2017

(65) Prior Publication Data
US 2018/0248795 A1    Aug. 30, 2018

(51) Int. Cl.
*H04L 12/46* (2006.01)
*H04L 29/12* (2006.01)

(52) U.S. Cl.
CPC ...... *H04L 12/4633* (2013.01); *H04L 12/4641* (2013.01); *H04L 61/103* (2013.01); *H04L 61/6022* (2013.01)

(58) Field of Classification Search
CPC .... H04L 45/54; H04L 45/586; H04L 61/6022
See application file for complete search history.

(56) References Cited

U.S. PATENT DOCUMENTS

| | | |
|---|---|---|
| 8,953,590 B1 | 2/2015 | Aggarwal et al. |
| 9,391,885 B1 | 7/2016 | Shukla et al. |
| 2009/0182854 A1* | 7/2009 | Sun ...................... H04L 12/4625 709/223 |
| 2013/0223454 A1* | 8/2013 | Dunbar .................. H04L 45/44 370/400 |
| 2015/0032870 A1* | 1/2015 | Lee ..................... H04L 12/2823 709/221 |
| 2015/0244617 A1* | 8/2015 | Nakil .................. G06F 9/45558 709/224 |

(Continued)

FOREIGN PATENT DOCUMENTS

| | | |
|---|---|---|
| WO | WO-2014032609 A1 | 3/2014 |
| WO | WO-2015127643 A1 | 9/2015 |

OTHER PUBLICATIONS

Sajassi et al. "BGP MPLS-Based Ethernet VPN"; Internet Engineering Task Force (IETF); Request for Comments: 7432; Category: Standards Track; ISSN: 2070-1721; Feb. 2015; pp. 1-56.

*Primary Examiner* — Brandon M Renner
*Assistant Examiner* — Jay L Vogel
(74) *Attorney, Agent, or Firm* — Behmke Innovation Group LLC; James Behmke; Stephen D. LeBarron

(57) ABSTRACT

In one embodiment, a device in a network monitors Ethernet virtual private network (EVPN) traffic in the network for a plurality of media access control (MAC) addresses. The device generates a machine learning-based traffic model for the MAC addresses based on the monitored EVPN traffic. The device determines a timeout for a particular one of the MAC addresses based on traffic predicted by the machine learning-based traffic model for the particular MAC address. The device causes the particular MAC address to be timed out from one or more forwarding tables in the network based on the determined timeout.

20 Claims, 9 Drawing Sheets

(56) References Cited

U.S. PATENT DOCUMENTS

2016/0028608 A1* 1/2016 Dasgupta ................ H04L 43/16
                                                                       370/252
2016/0043950 A1    2/2016 Vobbilisetty et al.
2017/0288948 A1* 10/2017 Singh .................. H04L 41/0659
2017/0373973 A1* 12/2017 Bickhart ............. H04L 12/4641

* cited by examiner

US 10,313,153 B2

ADAPTIVE MAC GROUPING AND TIMEOUT IN EVPN ENVIRONMENTS USING MACHINE LEARNING

TECHNICAL FIELD

The present disclosure relates generally to computer networks, and, more particularly, to adaptive media access control (MAC) grouping and timeout in Ethernet virtual private network (EVPN) using machine learning.

BACKGROUND

Layer 2 traffic, by its very nature, has presented certain challenges to creating Data Center (DC) interconnects. Notably, Layer 2 offers limited capabilities in terms of directing and controlling traffic, redundancy, multicasting, and the like. To address these limitations, a number of technologies have arisen in recent years, such as Overlay Transport Virtualization™ (OTV) from Cisco Systems, Inc., Virtual Private Local Area Network Service (VPLS), G.8032, and the like.

One promising technology to implement DC interconnects is Ethernet virtual private network (EVPN) technology. In general, an EVPN instance includes any number of customer edge devices (CEs), such as hosts, routers, switches, etc., and any number of provider edge devices (PEs) that are part of a Multiprotocol Label Switching (MPLS) infrastructure. During operation, the EVPN PEs provide virtualized, bridged Layer 2 connectivity between the CEs. Multiple EVPN instances can also be instantiated in a provider network, as well.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
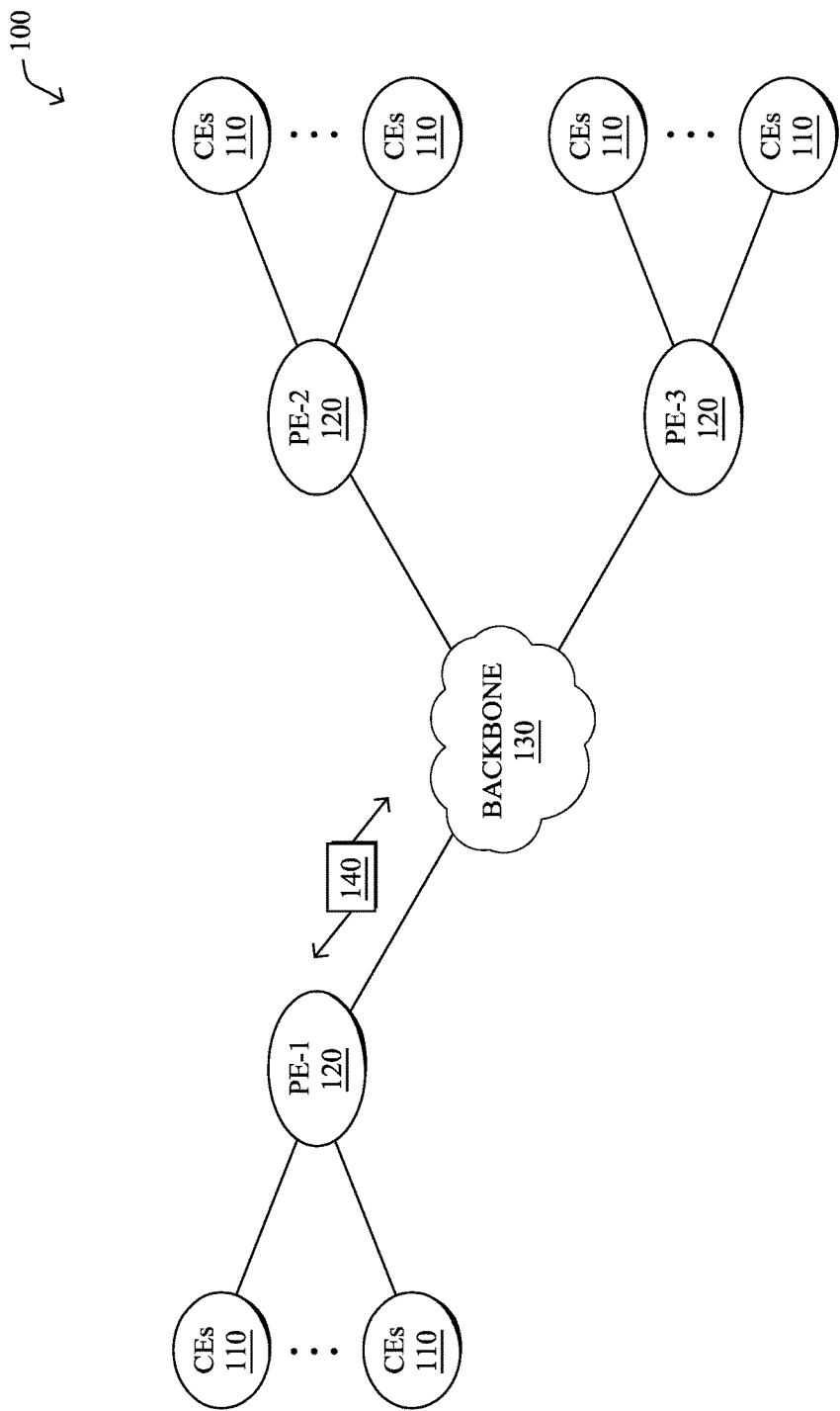
FIGS. 1A-1B illustrate an example communication network.

According to one or more embodiments of the disclosure, a device in a network monitors Ethernet virtual private network (EVPN) traffic in the network for a plurality of media access control (MAC) addresses. The device generates a machine learning-based traffic model for the MAC addresses based on the monitored EVPN traffic. The device determines a timeout for a particular one of the MAC addresses based on traffic predicted by the machine learning-based traffic model for the particular MAC address. The device causes the particular MAC address to be timed out from one or more forwarding tables in the network based on the determined timeout.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
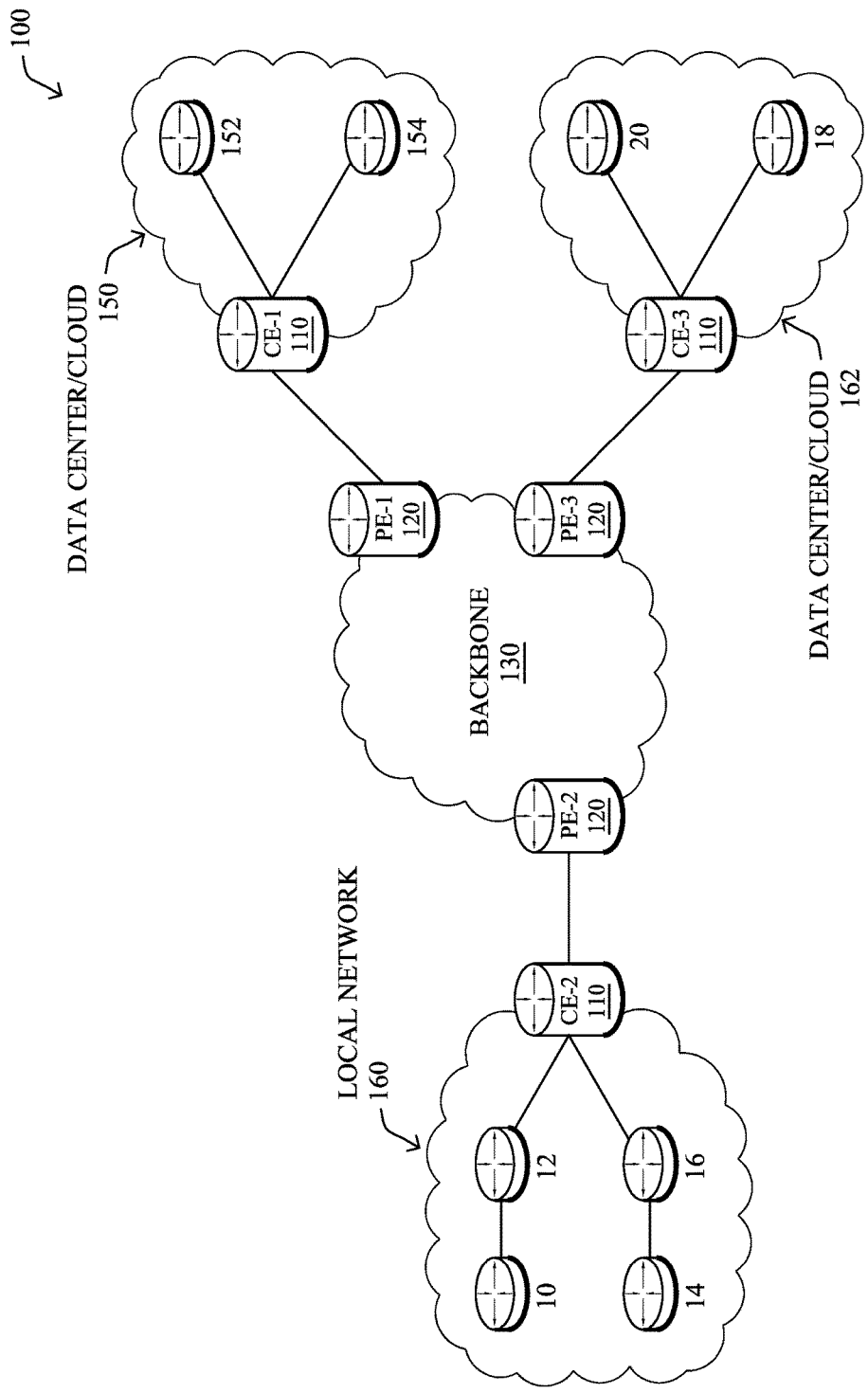

FIG. 1B illustrates an example of network 100 in greater detail, according to various embodiments. As shown, network backbone 130 may provide connectivity between devices located in different geographical areas and/or different types of local networks. For example, network 100 may comprise local/branch network 160 that include devices/nodes 10-16, respectively, as well as data center/cloud environments 150, 162 that includes servers 152-154 and servers 18-20, respectively. Notably, local network 160 and data center/cloud environments 150, 162 may be located in different geographic locations. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

Figure 2:
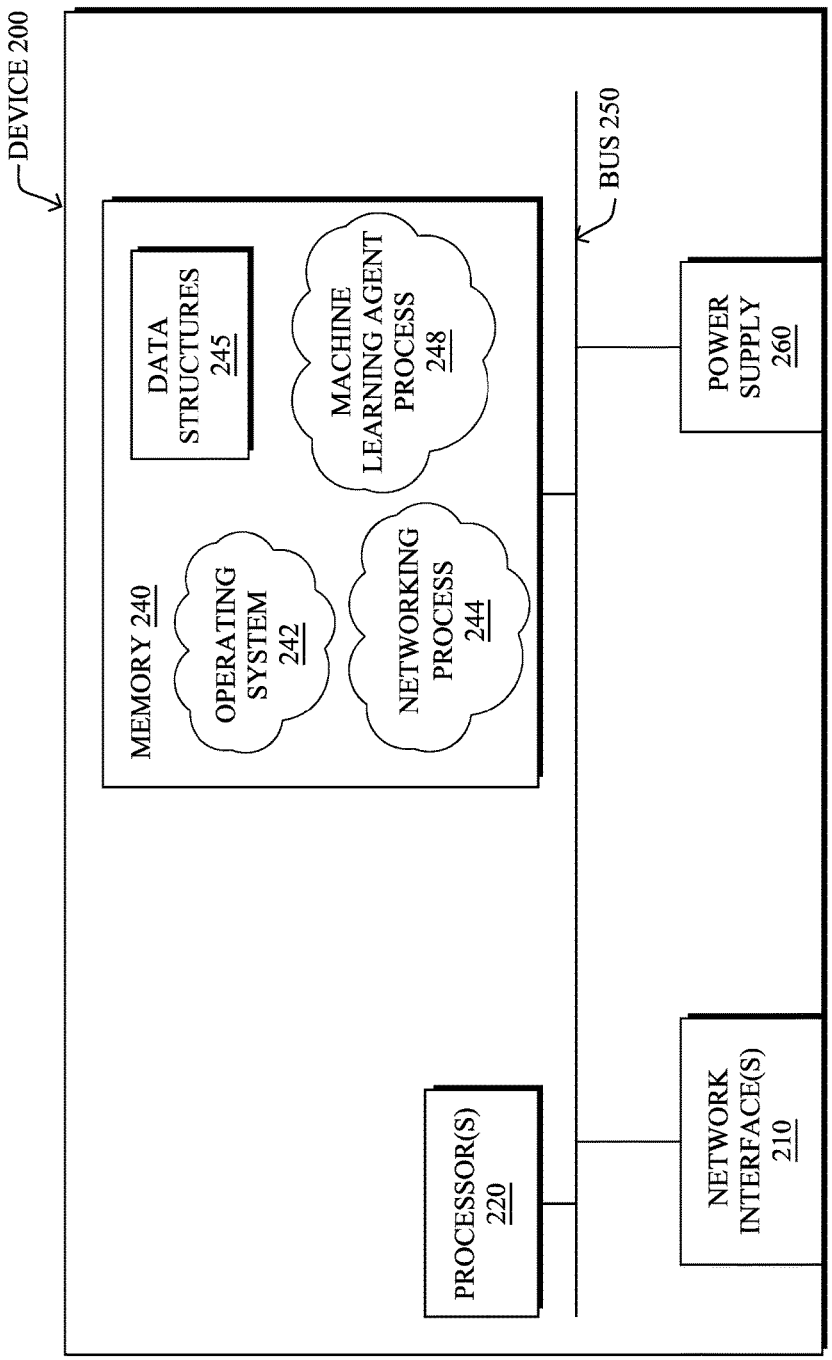
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-16, servers 18-20, 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise networking process 244 and illustratively, a machine learning agent process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Networking process/services 244 may include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, networking process 244 may also perform functions related to virtual routing protocols, such as maintaining VRF instance, or tunneling protocols, such as for MPLS, generalized MPLS (GMPLS), etc., each as will be understood by those skilled in the art. Also, according to various embodiments, networking process 244 may be operable to perform Ethernet VPN (EVPN) functions, as described in the IETF Internet Draft entitled "BGP MPLS Based Ethernet VPN"<draft-ietf-12vpn-evpn>. Generally, EVPN offers a solution for multipoint L2VPN services, with advanced multi-homing capabilities, using BGP for distributing customer/client media access control (MAC) address reachability information over the core MPLS/IP network.

Machine learning agent process 248 includes computer executable instructions that, when executed by processor(s) 220, cause device 200 to monitor and analyze network traffic flow patterns. In various embodiments, machine learning agent process 248 may model the monitored traffic, to predict future traffic associated with the traffic endpoints. For example, machine learning agent process 248 may predict future traffic associated with a particular MAC address in an EVPN instance, based on the observed/monitored traffic associated with that MAC address.

According to various embodiments, machine learning agent process 248 may employ any number of machine learning techniques, to assess a given traffic flow in the network. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, machine learning agent process 248 can use the model M to classify new data points, such as information regarding new traffic flows in the network. Often, M is a statistical model, and the cost function is inversely proportional to the likelihood of M, given the input data.

In various embodiments, machine learning agent process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample traffic data that is "normal," or "abnormal." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that machine learning agent process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, time series analysis techniques such as autoregressive integrated moving average (ARIMA) models, or the like.

The performance of a machine learning model can be evaluated in a number of ways based on the number of true positives, false positives, true negatives, and/or false negatives of the model. For example, in the case of a traffic prediction model, the false positives of the model may refer to the number of times the model incorrectly predicted that traffic should be seen in the network when it is not. Conversely, the false negatives of the model may refer to the number of times the model predicted there not to be traffic in the network when traffic is observed. True negatives and positives may refer to the number of times the model correctly predicted there not to be traffic or there to be traffic, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, machine learning agent process 248 may assess the captured traffic data on a per-flow basis. In other embodiments, machine learning agent process 248 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
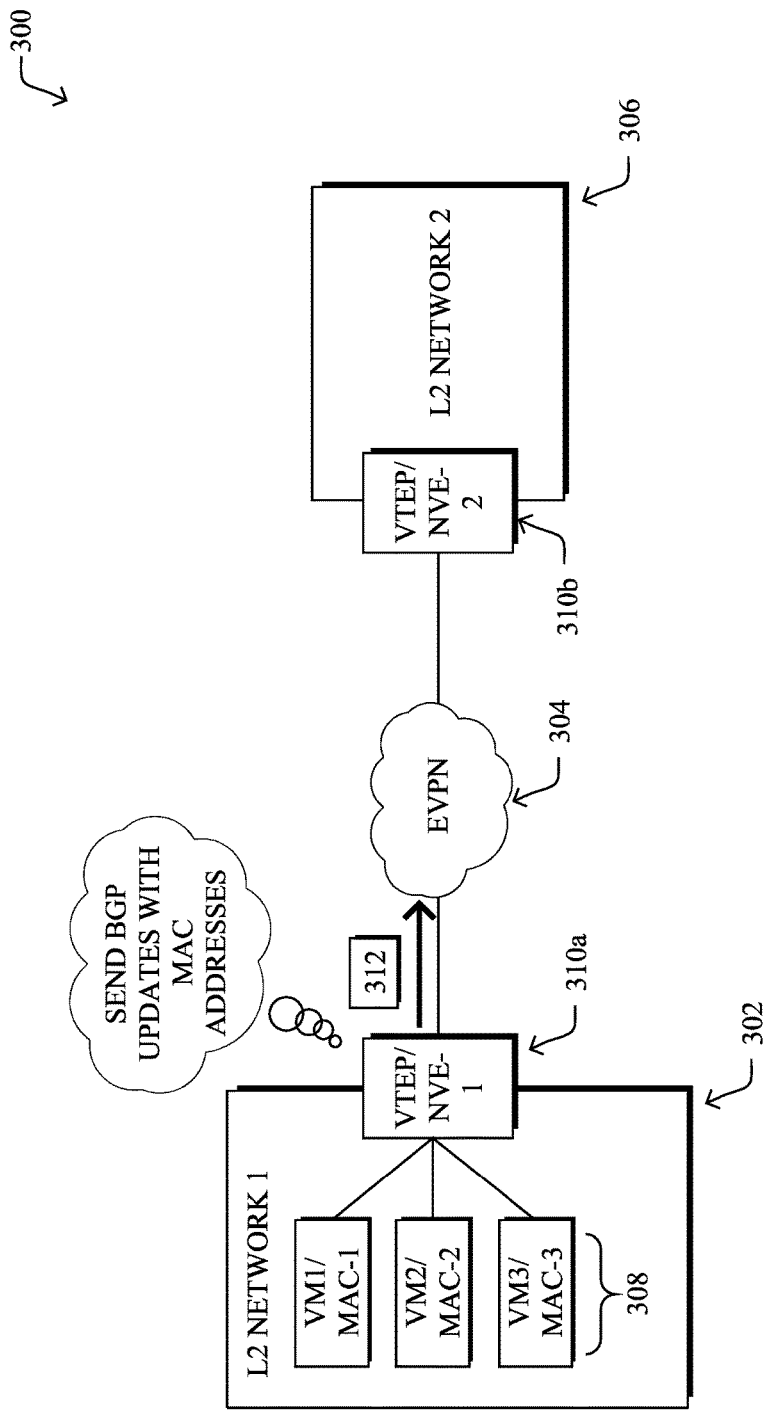
FIG. 3 illustrates an example Ethernet virtual private network (EVPN) instance.

As noted above, various overlay technologies now exist in Data Center (DC) environments to connect diversified Layer 2 networks. An example 300 of such an overlay is shown in FIG. 3, according to various embodiments. As shown, a first L2 network 302 may be connected to a second L2 network 306 via an EVPN instance 304. Notably, L2 network 302 may include any number of hosts or virtual machines (VMs) having associated MAC addresses, such as VMs/MACs 308. More specifically, VM1 may have a first MAC address, MAC-1, VM2 may have a second MAC address MAC-2, and VM3 may have a third MAC address MAC-3.

Each of VMs/MACs 308 may be in communication with a first device 310a in L2 network 302 that is in communication with a corresponding device 310b in L2 network 306. For example, device 310a may be a switch, router, or other device that comprises a Virtual Extensible LAN (VXLAN) tunnel endpoint (VTEP) and/or Network Virtual Interface (NVE) in communication device 310b that performs similar functions in L2 network 306.

During operation, when device 310a receives a frame from one of VMs 308, device 310a may learn the source MAC address. For example, assume that device 310a receives a frame from VM1 that has MAC address MAC-1. Based on the received frame, device 310*a* can now associate VM1 with MAC address MAC-1 (e.g., in its local forwarding table). In turn, device 310*a* may send a BGP update 312 to the remote nodes (e.g., device 310*b*, etc.) that advertises the learned MAC address, to update the local forwarding tables of the receiving nodes. In typical implementations, device 310*a* will also set a predefined timer for the learned MAC address in its local forwarding table and, after expiration of the timer, withdraw the advertised MAC address in the network.

For purposes of illustration, assume that each of VMs 308 exhibit very different traffic patterns. For example, assume that VM1 sends or receives only minimal traffic for only a few seconds at a time between long periods of silence (e.g., a DevOps server sending path upgrade send every day morning, etc.). Similarly, assume that VM2 periodically sends or receives traffic every thirty minutes. Finally, assume that VM3 is a random server that sends or receives traffic at what are effectively random points in time.

In the above scenario, each of MAC addresses of VMs 308, i.e., MAC-1 through MAC-3 may be associated with the same predefined timeout. Thus, after the timeout is reached for a given MAC address, device 310*a* will send a BGP update 312 to the other nodes in the network, to withdraw the MAC address from the nodes. However, in many cases, this will result in unwanted MAC addresses remaining in the forwarding tables for much longer than needed. For example, MAC-1 may remain in the forwarding tables far longer than needed, after VM1 sends out its daily traffic. In further cases, the predefined timeout may also result in a MAC address timing out before it will be needed again, resulting in unicast and/or Address Resolution Protocol (ARP)/Neighbor Discovery (ND) flooding. For example, if the timeout for MAC-2 is slightly less than thirty minutes in the above example, device 310*a* may prematurely timeout MAC-2, right before the traffic associated with VM2 is about to resume.

Adaptive MAC Grouping and Timeout in EVPN Environments Using Machine Learning

The techniques herein leverage behavior/pattern machine learning in resource sensitive, highly-optimizable environments such as DCs and virtualized environments, to determine optimal MAC address timeouts. Notably, by monitoring and modeling the traffic associated with each MAC address, the techniques herein can generate a customized timeout for a given MAC address, based on the predicted future traffic for the address. As would be appreciated, this reduces ARP flooding in the network and its corresponding resource utilization in virtualized environments. In addition, doing so allows for efficient forwarding plane resource utilization and may help to budget resources in a virtual environment. Further, the techniques herein can enhance the connectivity for an endpoint that communicates frequently by increasing its MAC timeout. Most importantly, learning timer expirations and learning actual resource usage for forwarding elements in a DC environment can be highly generalizable.

Specifically, according to one or more embodiments of the disclosure as described in detail below, a device in a network monitors Ethernet virtual private network (EVPN) traffic in the network for a plurality of media access control (MAC) addresses. The device generates a machine learning-based traffic model for the MAC addresses based on the monitored EVPN traffic. The device determines a timeout for a particular one of the MAC addresses based on traffic predicted by the machine learning-based traffic model for the particular MAC address. The device causes the particular MAC address to be timed out from one or more forwarding tables in the network based on the determined timeout.

Illustratively, the techniques described herein may be performed by hardware, software, and/or firmware, such as in accordance with the machine learning agent process 248, which may include computer executable instructions executed by the processor 220 (or independent processor of interfaces 210) to perform functions relating to the techniques described herein, e.g., in conjunction with networking process 244.

Figure 4A:
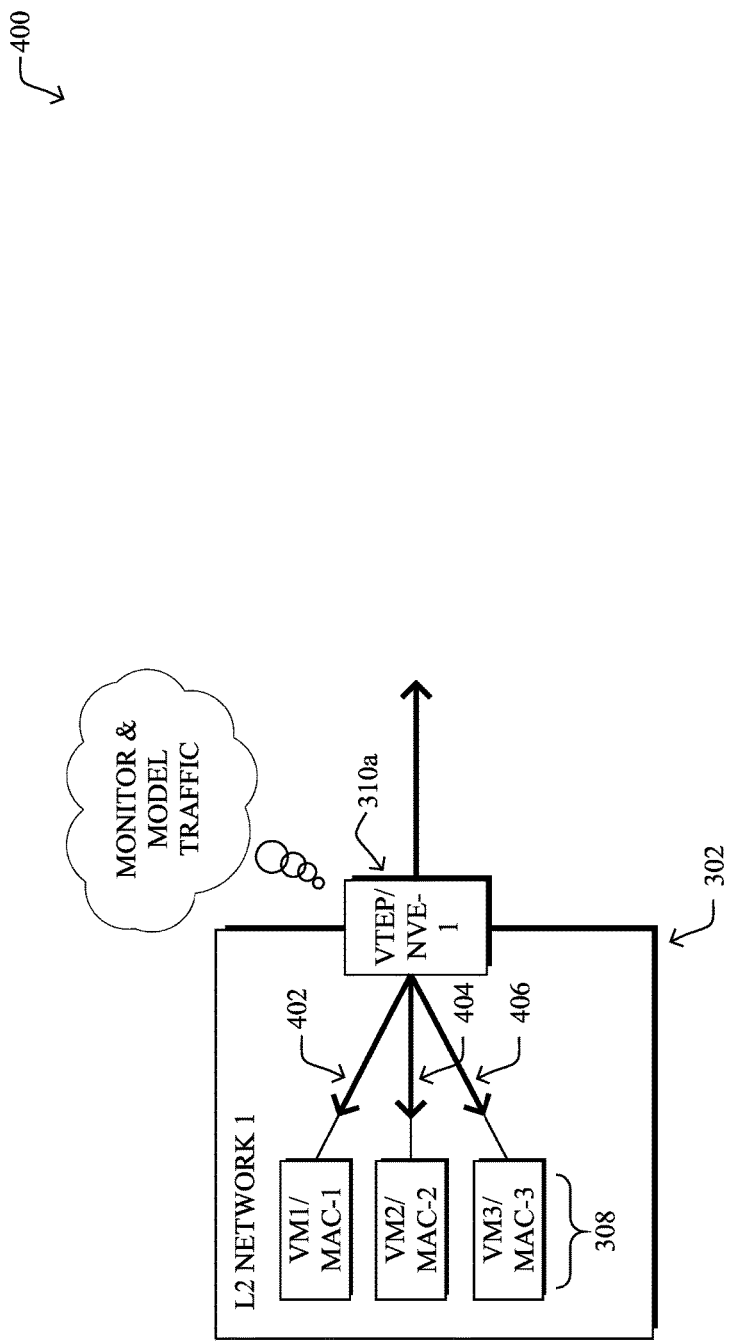
FIGS. 4A-4C illustrate examples of the propagation of media access control (MAC) address timeout information in an EVPN instance using machine learning.
Figure 4B:
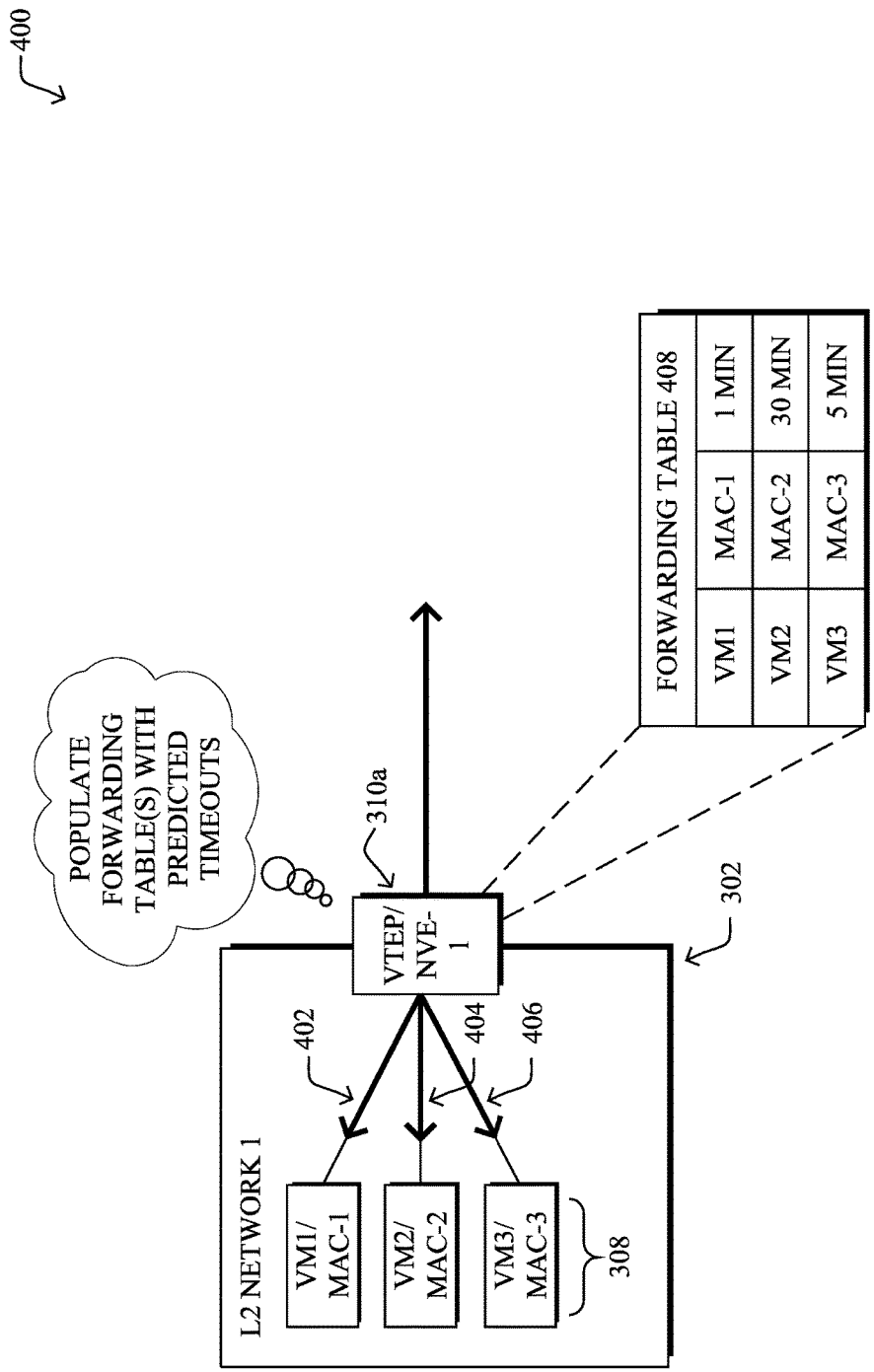
Figure 4C:
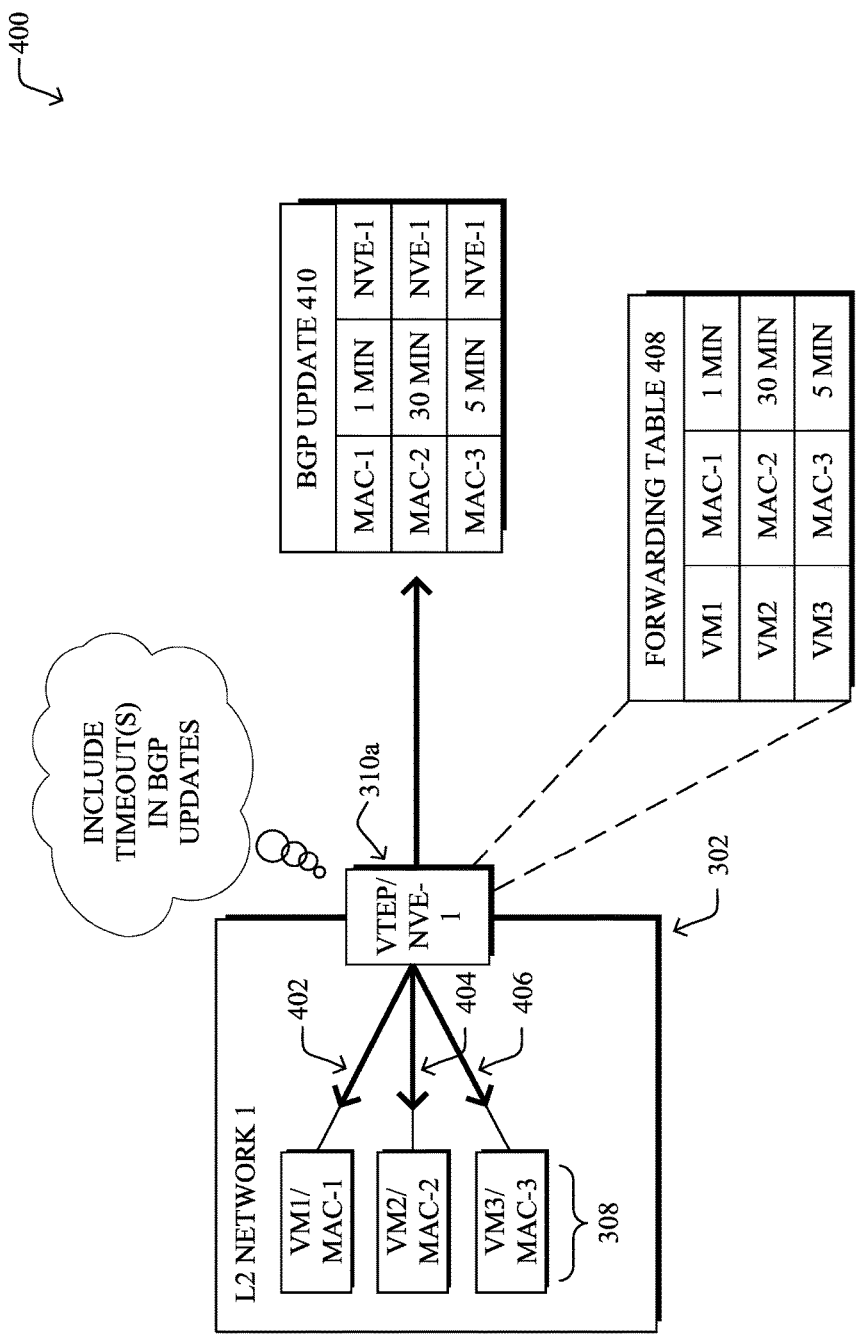

Operationally, FIGS. 4A-4C illustrate examples of the propagation of MAC address timeout information in an EVPN instance using machine learning, according to various embodiments. A key aspect herein is that a machine learning agent (e.g., process 248) can monitor and model EVPN traffic to predict future traffic patterns for the observed MAC addresses. In turn, the traffic predictions can be leveraged to set the timeouts for the MAC addresses based on the predicted traffic patterns.

As shown in example 400 of FIG. 4A, consider L2 network 302 described previously with respect to FIG. 3. According to various embodiments, a machine learning agent (e.g., process 248) may execute in conjunction with the edge VTEP/NVE device 310*a*, to monitor the EVPN traffic and model the traffic for the various observed MAC addresses. In some embodiments, device 310*a* may execute the machine learning agent directly or, alternatively, by another device in communication with the VTEP/NVE of device 310*a*.

For example, assume that VM1 has associated traffic 402, VM2 has associated traffic 404, and VM3 has associated traffic 406, each of which may exhibit very different patterns and frequencies. Notably, traffic 402 may be daily traffic, traffic 404 may appear periodically with breaks of several hours in between, and traffic 406 may be random.

During executing, the machine learning agent may monitor traffic 402-406 to capture at least the following features: 1.) their associated MAC addresses (e.g., MAC-1 through MAC-3), 2.) their timing information, and/or 3.) their associated endpoints (e.g., VM1-VM3). For example, by monitoring traffic 402, the machine learning agent may determine that traffic 402 is associated with VM1/MAC-1 and that traffic 402 is typically sent daily between 3:00-3:30 AM. In some embodiments, the machine learning agent may also monitor and capture the treatment of a given MAC address in the EVPN instance, such as its current or historical timeouts, how long it takes to relearn the MAC address after it is deleted from the forwarding tables, etc.

In various embodiments, the machine learning agent may use the captured information to generate a machine learning-based traffic model for the observed traffic. In general, given a certain MAC address, the model may predict when traffic is next expected to or from the MAC address. For example, one potential model may be a time series model that identifies patterns in the periods of silence between communications associated with the MAC address. In another embodiment, the model may be a classifier that is able to label a given time/MAC address pair as having either "expected traffic" or "no expected traffic."

Based on the pattern learning, as shown in FIG. 4B, the machine learning agent may instruct the edge VTEP to create different MAC forwarding tables with different characteristics. Each MAC forwarding table may have its own parameters, such as timeout, etc. For example, the agent may learn that VM1/MAC-1 has a pattern of not sending or receiving traffic after releasing patches. Accordingly, the machine learning agent may set a lowered timeout for MAC-1 in its local forwarding table 408, so that it will be released soon. Similarly, the agent may learn that VM2/MAC-2 has associated traffic every thirty minutes and, accordingly, set the time to approximately thirty minutes in forwarding table 408, to avoid the need to flood the network every thirty minutes. Depending on the traffic prediction for traffic 406, the machine learning agent may set the timeout for MAC-3 according to the prediction or, alternatively, use a default timeout. In some cases, the machine learning agent may also take into account additional information, such as the refresh time to relearn a MAC address after timeout and deletion, when setting the timeout for the MAC address.

As shown in FIG. 4C, after determining a timeout for a given MAC address, the machine learning agent may cause the VTEP/NVE to advertise this information to the remote VTEP nodes via BGP. For example, device 310a may send a BGP update 410 to the other VTEP nodes in the EVPN instance that associates MAC-1, MAC-2, and MAC-3 with NVE-1. In addition, according to various embodiments, BGP update 410 may also include the determined timeouts for MAC-1, MAC-2, and MAC-3 as an optional path attribute. In response to receiving such an update, the receiving node may use the included timeout information to remove the MAC addresses from its forwarding table(s). This is particularly of use in implementations that use Software Defined Networking (SDN)-based forwarding plane programming.

Figure 5:
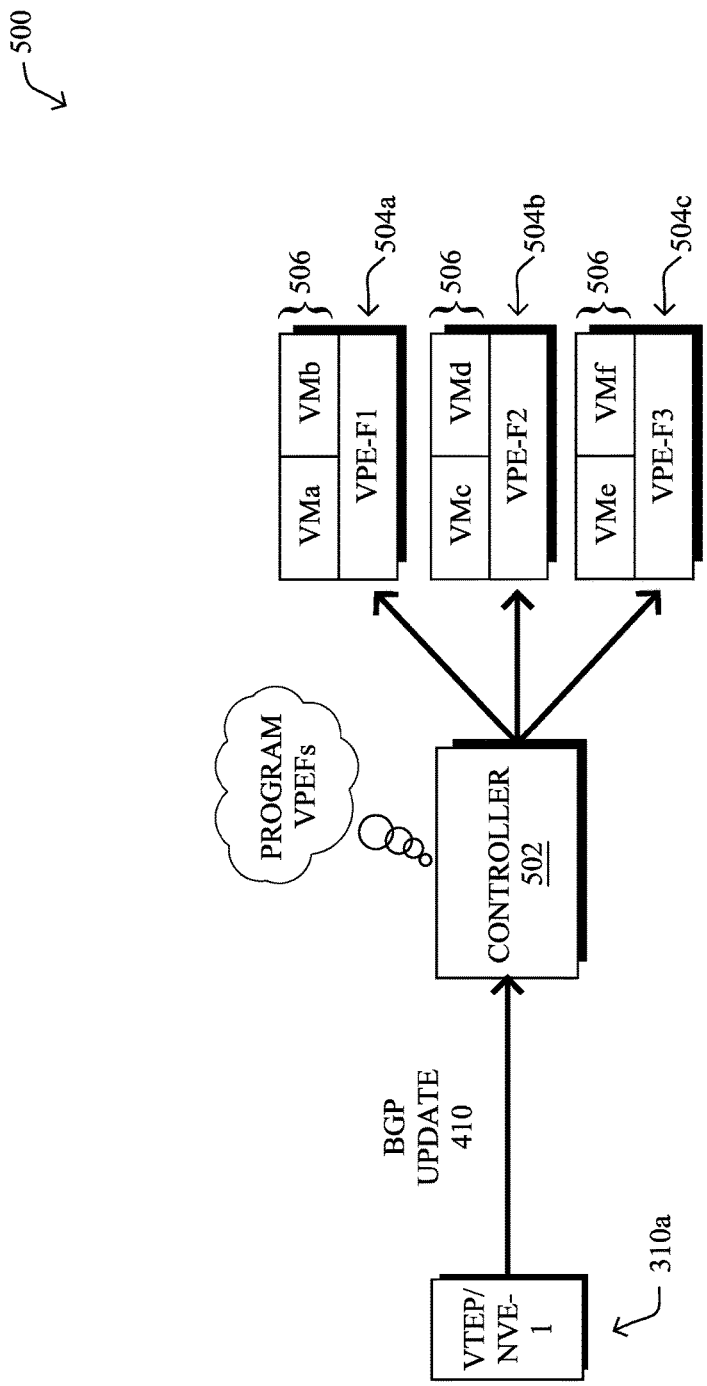
FIG. 5 illustrates an example of the use of MAC address timeout information in an EVPN instance.

FIG. 5 illustrates an example of the use of MAC address timeout information in an EVPN instance, according to various embodiments. As shown in example 500, assume that device 310a described previously is part of an SDN-based forwarding plane that includes a controller 502 that oversees a number of virtual PE forwarders (VEP-Fs) 504a-504c. Each of VPE-Fs 504a-504c may be connected to any number of VMs 506, which may have their own corresponding MAC addresses.

Using the techniques herein, the VTEP/NVE-1 may advertise its MAC entries and calculated timeouts to controller 502 via EVPN-BGP update 410. In turn, controller 510 may use the received MAC address and timeout information, to program VPE-F 504a-504c. In other words, controller 502 may update the forwarding tables of VPE-Fs 504a-504c, so as to age out the MAC addresses in update 410, according to their individual timeouts.

As would be appreciated, the above approach will help to avoid having MAC entries persist longer than needed in the forwarding tables and are only sporadically used. In addition, the techniques will also drastically reduce unicast and ND/ARP flooding by maintaining the entries longer for MAC addresses that are more heavily used.

In further embodiments, while the above is directed towards EVPN scenarios, the techniques herein can also be applied to other scenarios, as well. For example, in the case of Overlay Transport Virtualization™ (OTV) from Cisco Systems, Inc., the timeout information can instead be advertised using IS-IS.

Figure 6:
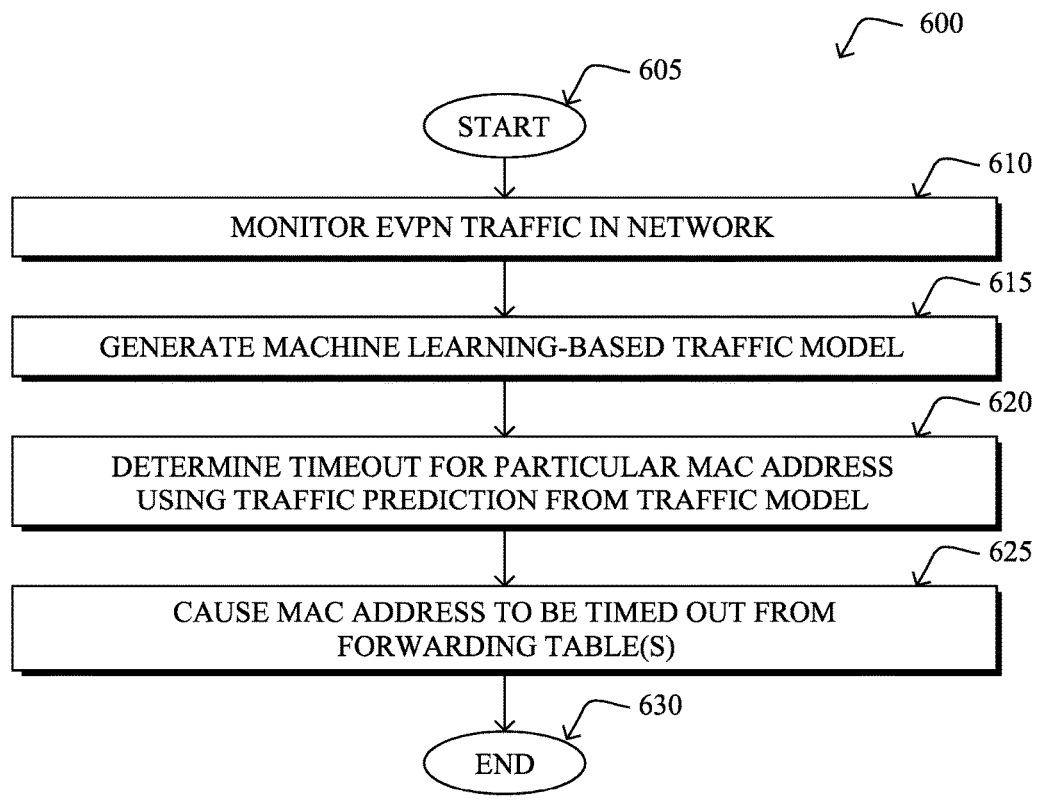
FIG. 6 illustrates an example simplified procedure for causing the timeout of a MAC address in a network.

FIG. 6 illustrates an example simplified procedure for causing the timeout of a MAC address in a network, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may monitor EVPN traffic in the network for a plurality of MAC addresses. For example, the device may determine the source and/or destination MAC address of the traffic, the timing information for the traffic (e.g., when the traffic was sent, observed, and/or received), etc. In some cases, the device itself may comprise a Virtual Extensible LAN (VX-LAN) tunnel endpoint (VTEP). In other cases, the device may monitor EVPN traffic associated with a VTEP or NVE, instead.

At step 615, as detailed above, the device may generate a machine learning-based traffic model for the observed MAC addresses based on the monitored EVPN traffic. In general, the traffic model may be trained to predict future traffic for a given MAC address, based on the monitored traffic for the MAC address. For example, if the MAC address sends traffic each day at 1:00 AM for exactly one hour, the model may predict that the MAC address will again send traffic tomorrow at 1:00 AM for exactly one hour. Any form of suitable machine learning model may be used to model the traffic. For example, the model may comprise a time series model, a classifier, or the like.

At step 620, the device may determine a timeout for a particular MAC address based on traffic predicted by the machine learning-based traffic model for the particular MAC address, as described in greater detail above. For example, if the model predicts that the MAC address will not send or receive traffic again for another day, the device may set a very low timeout for the MAC address (e.g., on the order of seconds or minutes). Conversely, if the model predicts that the MAC address is going to send traffic again in twenty minutes, the device may determine a timeout long enough to ensure that the MAC address is not timed out from the EVPN tables in the network prematurely.

At step 625, as detailed above, the device may cause the MAC address to be timed out from one or more forwarding tables in the network based on the determined timeout from step 620. If the device itself comprises a VTEP/NVE, the device may include an indication of the timeout and the particular MAC address in a BPG update to the network. Similarly, if the device simply monitors a VTEP/NVE, it may cause the VTEP/NVE to send the BGP update. In further embodiments, the device may cause an IS-IS message to be sent that includes the MAC address and an indication of the timeout, such as in the case of OTV or the like. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage behavioral learning to generate a MAC address timeout strategy that reduces unicast/ARP flooding in the network and ternary content-addressable memory (TCAM) usage. This is particularly of importance in SDN-based forwarding plane programming. Said differently, the techniques herein optimize forwarding based on machine/behavioral learning in a datacenter environment, and can also be generalized to timer-based forwarding elements in other environments, as well.

While there have been shown and described illustrative embodiments that provide for the generation of customized MAC address timeouts in a network, it is to be understood that various other adaptations and modifications may be made within the spirit and scope of the embodiments herein. For example, while certain embodiments are described herein with respect to using certain models for purposes of modeling EVPN traffic, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising: monitoring, by a device in a network, Ethernet virtual private network (EVPN) traffic in the network for a plurality of media access control (MAC) addresses; generating, by the device, a machine learning-based traffic model for the MAC addresses based on the monitored EVPN traffic, wherein the machine learning-based traffic model predicts future traffic patterns for a particular one of the MAC addresses; determining, by the device, a timeout for the particular MAC address based on the future traffic patterns predicted by the machine learning-based traffic model for the particular MAC address; and causing, by the device, the particular MAC address to be timed out from one or more forwarding tables in the network based on the determined timeout.

2. The method as in claim 1, further comprising: timing out the particular MAC address from a forwarding table of the device based on the determined timeout.

3. The method as in claim 1, wherein the device comprises a Virtual Extensible LAN (VXLAN) tunnel endpoint (VTEP).

4. The method as in claim 1, wherein causing the particular MAC address to be timed out from one or more forwarding tables in the network comprises: sending, by the device, an indication of the determined timeout to a controller of one or more virtual routers.

5. The method as in claim 1, wherein causing the particular MAC address to be timed out from one or more forwarding tables in the network comprises: sending, by the device, a Border Gateway Protocol (BGP) update in the network that includes an indication of the particular MAC address and the determined timeout for the particular MAC address.

6. The method as in claim 1, wherein causing the particular MAC address to be timed out from one or more forwarding tables in the network comprises: causing, by the device, a Border Gateway Protocol (BGP) update to be sent in the network that includes an indication of the particular MAC address and the determined timeout for the particular MAC address.

7. The method as in claim 1, wherein causing the particular MAC address to be timed out from one or more forwarding tables in the network comprises: causing, by the device, an Intermediate-System-to-Intermediate-System (IS-IS) message to be sent in the network that includes an indication of the particular MAC address and the determined timeout for the particular MAC address.

8. The method as in claim 1, wherein the particular MAC address is associated with a virtual machine (VM) in the network.

9. An apparatus, comprising: one or more network interfaces to communicate with a network; a processor coupled to the one or more network interfaces and configured to execute a process; and a memory configured to store the process executable by the processor, the process when executed operable to: monitor Ethernet virtual private network (EVPN) traffic in the network for a plurality of media access control (MAC) addresses; generate a machine learning-based traffic model for the MAC addresses based on the monitored EVPN traffic, wherein the machine learning-based traffic model predicts future traffic patterns for a particular one of the MAC addresses; determine a timeout for the particular MAC address based on the future traffic patterns predicted by the machine learning-based traffic model for the particular MAC address; and cause the particular MAC address to be timed out from one or more forwarding tables in the network based on the determined timeout.

10. The apparatus as in claim 9, wherein the process when executed is further operable to: time out the particular MAC address from a forwarding table of the device based on the determined timeout.

11. The apparatus as in claim 9, wherein the apparatus comprises a Virtual Extensible LAN (VXLAN) tunnel endpoint (VTEP).

12. The apparatus as in claim 9, wherein the apparatus causes the particular MAC address to be timed out from one or more forwarding tables in the network by: sending an indication of the determined timeout to a controller of one or more virtual routers.

13. The apparatus as in claim 9, wherein the apparatus causes the particular MAC address to be timed out from one or more forwarding tables in the network by: sending a Border Gateway Protocol (BGP) update in the network that includes an indication of the particular MAC address and the determined timeout for the particular MAC address.

14. The apparatus as in claim 9, wherein the apparatus causes the particular MAC address to be timed out from one or more forwarding tables in the network by: causing a Border Gateway Protocol (BGP) update to be sent in the network that includes an indication of the particular MAC address and the determined timeout for the particular MAC address.

15. The apparatus as in claim 9, wherein the apparatus causes the particular MAC address to be timed out from one or more forwarding tables in the network by: causing an Intermediate-System-to-Intermediate-System (IS-IS) message to be sent in the network that includes an indication of the particular MAC address and the determined timeout for the particular MAC address.

16. The apparatus as in claim 9, wherein the particular MAC address is associated with a virtual machine (VM) in the network.

17. A tangible, non-transitory, computer-readable medium storing program instructions that, when executed by a device in a network, cause the device to perform a process comprising: monitoring, by the device, Ethernet virtual private network (EVPN) traffic in the network for a plurality of media access control (MAC) addresses; generating, by the device, a machine learning-based traffic model for the MAC addresses based on the monitored EVPN traffic, wherein the machine learning-based traffic model predicts future traffic patterns for a particular one of the MAC addresses; determining, by the device, a timeout for the particular MAC address based on the future traffic patterns predicted by the machine learning-based traffic model for the particular MAC address; and causing, by the device, the particular MAC address to be timed out from one or more forwarding tables in the network based on the determined timeout.

18. The computer-readable medium as in claim 17, wherein causing the particular MAC address to be timed out from one or more forwarding tables in the network comprises: sending, by the device, a Border Gateway Protocol (BGP) update in the network that includes an indication of the particular MAC address and the determined timeout for the particular MAC address.

19. The computer-readable medium as in claim 17, wherein causing the particular MAC address to be timed out from one or more forwarding tables in the network comprises: causing, by the device, a Border Gateway Protocol (BGP) update to be sent in the network that includes an indication of the particular MAC address and the determined timeout for the particular MAC address.

20. The computer-readable medium as in claim 17, wherein the particular MAC address is associated with a virtual machine (VM) in the network.

* * * * *